(12) United States Patent
Roberts

(10) Patent No.: US 9,563,411 B2
(45) Date of Patent: Feb. 7, 2017

(54) FLOW ANALYSIS INSTRUMENTATION

(75) Inventor: Andrew F. Roberts, Melrose, MA (US)

(73) Assignee: Ab Initio Technology LLC, Lexington, MA (US)

( * ) Notice: Subject to any disclaimer, the term of this patent is extended or adjusted under 35 U.S.C. 154(b) by 1055 days.

(21) Appl. No.: 13/344,155

(22) Filed: Jan. 5, 2012

(65) Prior Publication Data

US 2012/0179726 A1 Jul. 12, 2012

Related U.S. Application Data

(60) Provisional application No. 61/430,625, filed on Jan. 7, 2011.

(51) Int. Cl.
*G06F 9/45* (2006.01)
*G06F 11/36* (2006.01)

(52) U.S. Cl.
CPC ........... *G06F 8/433* (2013.01); *G06F 11/3604* (2013.01); *G06F 11/3624* (2013.01)

(58) Field of Classification Search
CPC ................................................ G06F 17/30011
See application file for complete search history.

(56) References Cited

U.S. PATENT DOCUMENTS

| 7,406,424 B2* | 7/2008 | Cheeniyil et al. ............ 705/301 |
| 2005/0175341 A1* | 8/2005 | Ovadia ............................ 398/43 |
| 2006/0085532 A1* | 4/2006 | Chu ....................... H04L 41/046 709/223 |

OTHER PUBLICATIONS

"Flow-based programming," Wikipedia, 12 pages.
Geimer, Markus, et al., "A Generic and Configurable Source-Code Instrumentation Component." ICCS 2009, Part II, LNCS 5545, pp. 696-705.
International Search Report & Written Opinion, PCT/US2012/020334, mailed Mar. 29, 2012, 12 pages.
"Profiling (computer-programming)," Wikipedia, 5 pages.
Chinese Office Action for Application No. 2012800116609 issued Dec. 3, 2015, 8 pages.

\* cited by examiner

*Primary Examiner* — Hosain Alam
*Assistant Examiner* — Tuan-Khanh Phan
(74) *Attorney, Agent, or Firm* — Fish & Richardson P.C.

(57) ABSTRACT

Methods, systems, and apparatus, including computer programs encoded on a computer storage medium, for flow analysis. In one aspect, a method includes modifying a dataflow graph, the dataflow graph including a plurality of paths connecting at least one entry point and at least one exit point, including adding components to the dataflow graph that add flow units to data records and remove flow units from data records, each flow unit identifying a segment of a path traversed by the data record. The method also includes identifying execution paths based on flow units obtained by processing a plurality of data records using the modified dataflow graph. The method also includes determining a subset of the plurality of data records, wherein a selected set of execution paths are represented by the subset.

26 Claims, 11 Drawing Sheets

FLOW ANALYSIS INSTRUMENTATION

CROSS-REFERENCE TO RELATED APPLICATIONS

This application claims priority to U.S. Provisional Application Ser. No. 61/430,625, filed on Jan. 7, 2011, entitled "Flow Analysis Instrumentation," the entire contents of which are hereby incorporated by reference.

BACKGROUND

This specification relates to flow analysis.

Dataflow graphs are used to perform operations on data. Data is supplied to the dataflow graph. The dataflow graph performs a sequence of operations on the data. In some scenarios, the sequence of operations performed on the data can vary from data record to data record.

Small sets of data records are used to test dataflow graphs; however, selecting a set of data records can be difficult because the set of data records selected may not be representative of data records in a production environment.

SUMMARY

This specification describes technologies relating to flow analysis.

In general, one aspect of the subject matter described in this specification can be embodied in methods that include the actions of modifying a dataflow graph, the dataflow graph including a plurality of paths connecting at least one entry point and at least one exit point. Modifying the dataflow graph includes adding components to the dataflow graph that add flow units to data records and remove flow units from data records, each flow unit identifying a segment of a path traversed by the data record. Methods also include the actions of identifying execution paths based on flow units obtained by processing a plurality of data records using the modified dataflow graph. Methods also include the actions of determining a subset of the plurality of data records, wherein a selected set of execution paths are represented by the subset. These and other embodiments can each optionally include one or more of the following features. Identifying an execution path may include determining a set of flow units added to a data record. Features can also include identifying unused paths in the plurality of paths that are not in the execution paths. Features can also include processing the subset of plurality of data records using the dataflow graph. Processing the plurality of data records may include adding a first flow unit to a data record of the plurality of data records. Processing the plurality of data cords may include adding a second flow unit to the data record and adding the first flow unit to the second flow unit. Identifying execution paths may include removing flow units from the plurality of data records processed using the modified dataflow graph and analyzing the removed flow units to determine an execution path for each data record. Determining a subset of the plurality of data records may include identifying data records that have one the selected execution paths.

Particular embodiments of the subject matter described in this specification can be implemented so as to realize one or more of the following advantages. Debugging a dataflow graph can be simplified. Sample sets of data records can be selected which fully exercise the dataflow graph. Individual records can be traced as they flow through the graph. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Generally, flow analysis enables a more complete understanding of the distribution of values within a set of data records, the relationships between data records, and the way in which data records are processed to produce output records.

Figure 1:
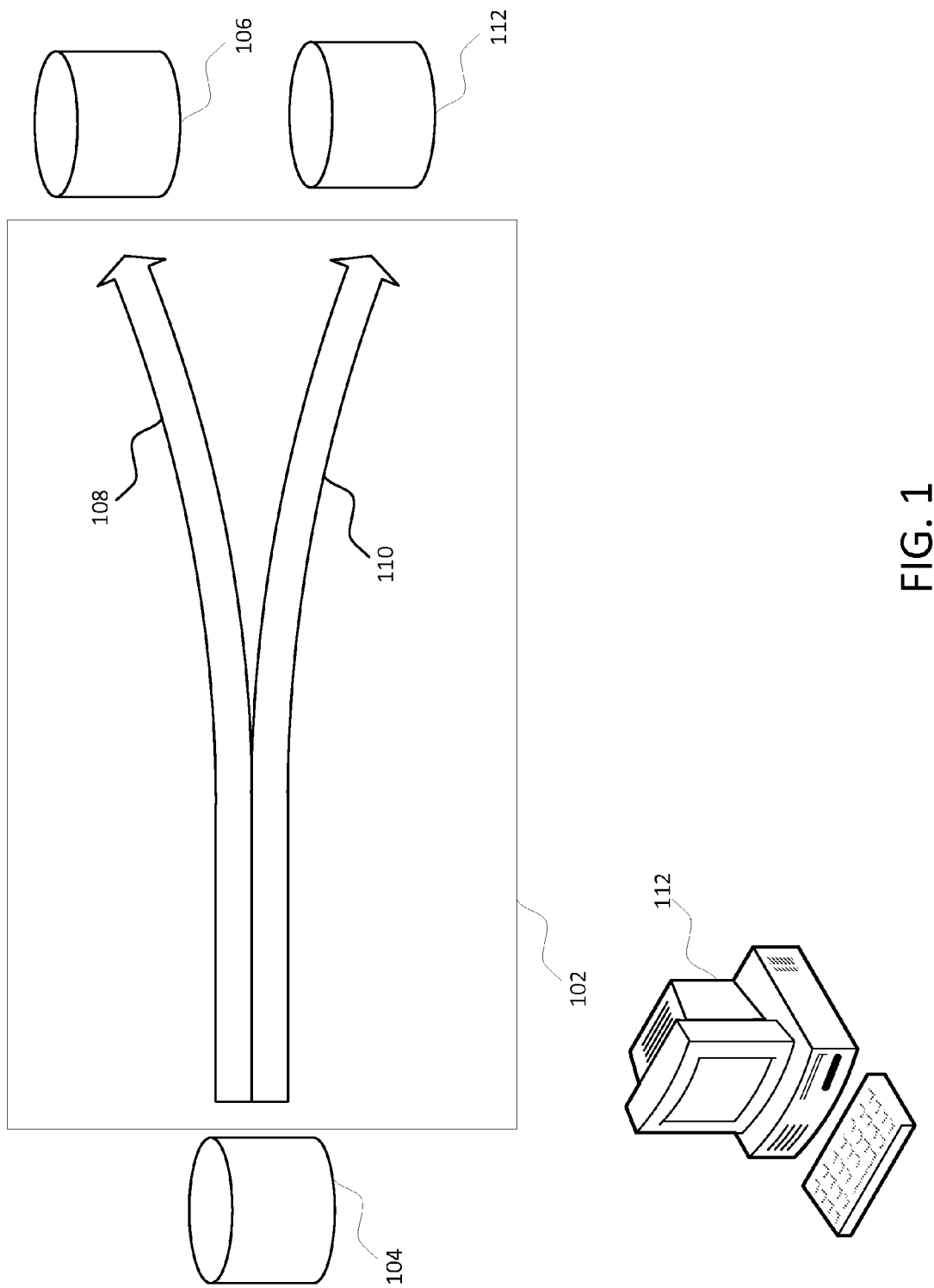
FIG. 1 illustrates execution paths through a dataflow graph.

FIG. 1 illustrates execution paths through a dataflow graph. A dataflow graph 102 includes multiple paths, for example path 108 and path 110, by which data records can be processed from an entry point 104 (e.g., a data source) to an exit point 106, 112 (e.g., a data sink). In the example, path 108 flows from entry point 104 to exit point 106. Path 110 starts with the same entry point 104 but branches to exit point 112.

In general, a dataflow graph is made up of components and links which identify flows of data records among the components. Components include data sources, data sinks, and components for processing. A data source can provide an entry point into the dataflow graph and may read a set of data records that are processed by the graph. For example, a data source can include a table in a relational database or a file on a file system. The data source reads records from the table or file and creates data records. A data sink can provide an exit point from the dataflow graph and may store output records once the data flow graph has completed processing. Data sources and sinks may include, for example, a relational database table or a file stored on a file system. The dataflow graph may be executed on a computer 112 or other type of computer device. In other implementations, the execution of the dataflow graph may be distributed among multiple computing devices.

In some implementations, components can include input ports and output ports. Links connect an output port of a first component to an input port of a second component. Some components may have multiple input and output ports. The sequence of components and links by which a data record can navigate from an entry point to an exit point is referred to as a path (e.g. path 108, 110).

Flow analysis is the process of tracking the flow of data records through one or more dataflow graphs. Flow analysis enables a new set of applications in the areas of debugging, testing and profiling. For debugging, flow analysis enables tracing an individual data record as it is processed by the graph. A user may mark one or more records, or stop at a breakpoint, and a graphical development environment traces the specified record's path through the graph, including identifying any records which depend on the specified record and any records upon which the specified record depends. A developer can identify an output data record which may have exhibited unexpected results, see the input data records which were used to create the data record, and track those input data records to determine where the dataflow graph may not behave as expected.

For testing, flow analysis enables a user to generate subsets of input data which contain only records that pass through specific pathways. By selecting input data based on specific pathways through the dataflow graph, referential integrity of the processed data records may be preserved.

For profiling, flow analysis enables users to create graphs that categorize records into groups and then generate subsets of records from the input datasets upon which the records in these categories depend. For example, a graph may group input customers and transactions by domicile and product category, and then split the customer and transaction records according to which computed output records land in a "profitable" output data sink versus an "unprofitable" sink.

Figure 2:
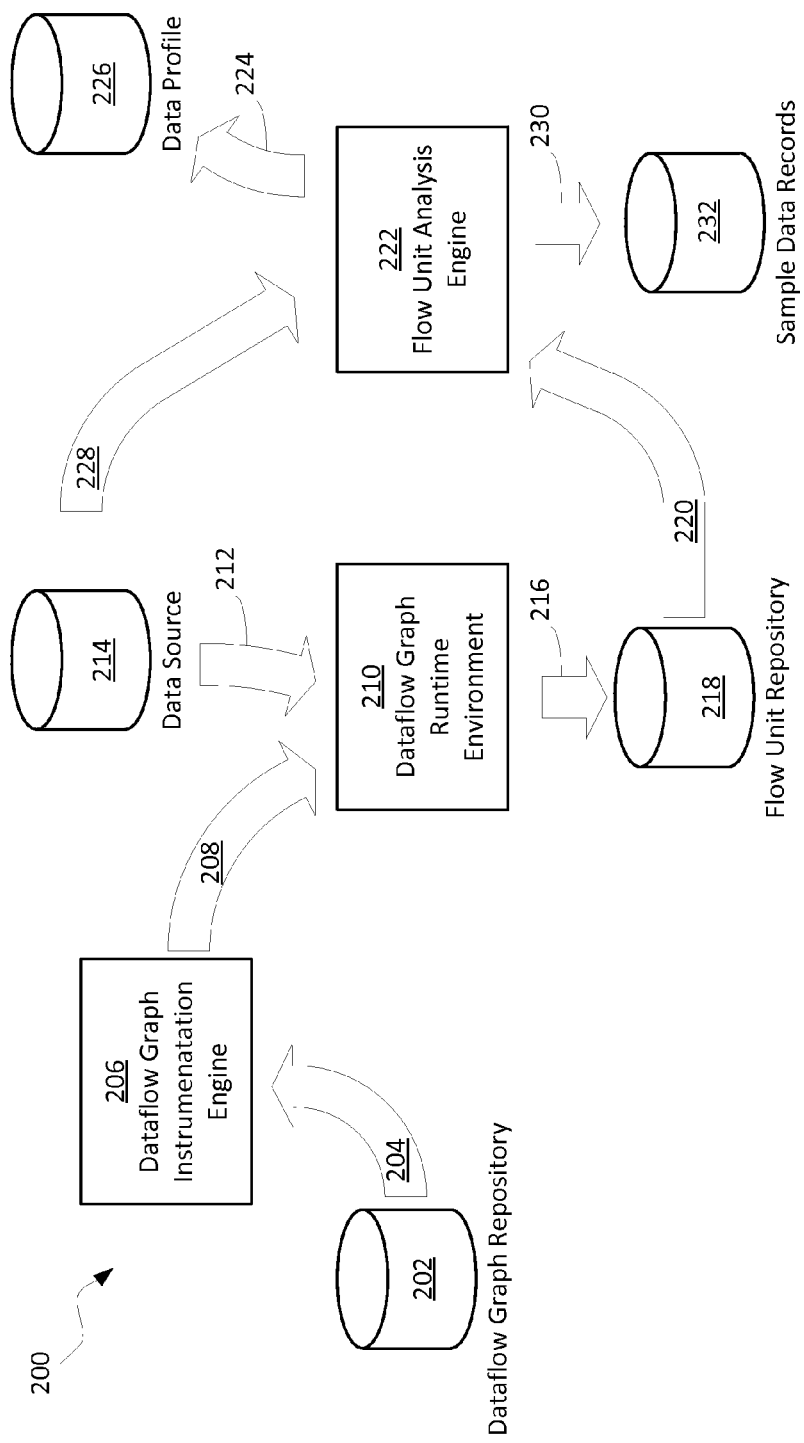
FIG. 2 illustrates an example environment in which the record lineage of data records can be determined.

FIG. 2 illustrates an example environment in which the lineage of data records can be determined. An example system 200 executing on a computer, for example the computer 112 from FIG. 1, includes a dataflow graph repository 202. Represented by process arrow 204, a dataflow graph instrumentation engine 206 obtains a dataflow graph from the dataflow graph repository 202. The dataflow graph instrumentation engine 206 modifies the dataflow graph to enable the dataflow graph to track the record level lineage of data records as they are processed by the modified graph, as discussed below. The dataflow graph instrumentation engine 206 can be, for example, a process executing on the computer.

In some implementations, the dataflow graph instrumentation engine 206 adds processing components to the dataflow graph that enable the flow of a data record through the dataflow graph to be tracked. For example, the additional processing component can add additional fields to each data record. These additional fields can be referred to as a flow unit. In some implementations each flow unit identifies a segment of a path through the dataflow graph. The flow units can be removed from the data record and stored for later analysis.

In some implementations, the dataflow graph instrumentation engine can itself include an instrumentation dataflow graph which accepts as input a dataflow graph and produces a modified dataflow graph.

Represented by process arrow 208, the modified dataflow graph can be provided to the dataflow graph run-time environment 210, which can be one or more processes executing on a computer or multiple computers. Represented by process arrow 212 data records from a data source 214 are provided to the dataflow graph run-time environment 210. The dataflow graph run-time environment 210 processes the data records using the modified dataflow graph.

Represented by process arrow 216, the modified dataflow graph stores the flow units in a flow unit repository 218. The flow unit repository 218 can be, for example, a relational database or a file stored on the file system.

Represented by process arrow 220, a flow unit analysis engine 222 analyzes the stored flow units. From the stored flow units the flow unit analysis engine 222 can determine the various paths each data record took as it was processed by the dataflow graph. Flow unit analysis engine 222 can determine all of the different paths through the dataflow graph that were taken by at least one data record.

The flow unit analysis engine 222 can also determine record dependencies. In some scenarios, an output record depends upon multiple input records. For example, a dataflow graph may calculate a total value of the orders places by a customer over the course of a year. Each order would represent a separate input record, and the aggregate of these records would produce a single output record. The flow unit analysis engine 222 can determine each input data record and every intermediate data record that was used in the creation of an output record.

Represented by process arrow 224, the flow unit analysis engine 222 can store a data profile 226 describing the data records produced by the modified dataflow.

Represented by process arrow 228, the flow unit analysis engine 222 can also accept the data records from the data source 214. The flow unit analysis engine 222 can use the flow units to determine a representative sample of data records. In some implementations, the representative sample is determined so that at least one sample data record and its processed predecessor records will take each of the different paths in the dataflow graph. In some implementations, the representative sample is determined so that each data record in the subset takes the same path.

The flow unit analysis engine 222 can determine the subset of data records so that the flow coverage of a subset of records through of the dataflow graph remains consistent when compared to the flow coverage produced by the dataflow graph when processing the complete set of data records from the data source 214. For example, a dataflow graph may include a component which aggregates the value of transaction records based on zip code. When selecting a record with a particular ZIP code, the flow unit analysis engine 222 selects all of the data records corresponding to that ZIP code. Therefore the aggregated value for that zip code remains consistent whether processing the subset of data records or processing all the data records in the data source 214. In some implementations, the flow unit analysis engine 222 can determine a subset of data which maintains a distribution of flow coverage through the data flow graph. For example, if ten percent of customers are rejected during processing the complete set of data records then ten percent of customers would be rejected when processing the subset of data records.

Represented by process arrow 230, the flow unit analysis engine 222 can store the subset of data records in a sample data records repository 232.

In one implementation, execution of an instrumented dataflow graph is paused. In the paused state, a data record in one of the components is selected by having the user first select a component in the dataflow graph. The system 200 shows the user the set of records lodged in the component in the paused state so that the user may second select a record for observation. Using the flow unit data associated with the selected record, the system 200 may determine the set of all preceding records (both input records, and those intermediate records produced by components in the graph leading up to the component containing the selected record). Using this set of input records, the system 200 may now create a collection of input data subsets containing only these selected records and then relaunch the graph with these data subsets. The graph may now step through execution of the selected records to enable the user to observe the behavior of the graph up to the execution of the component he had first selected.

Figure 3:
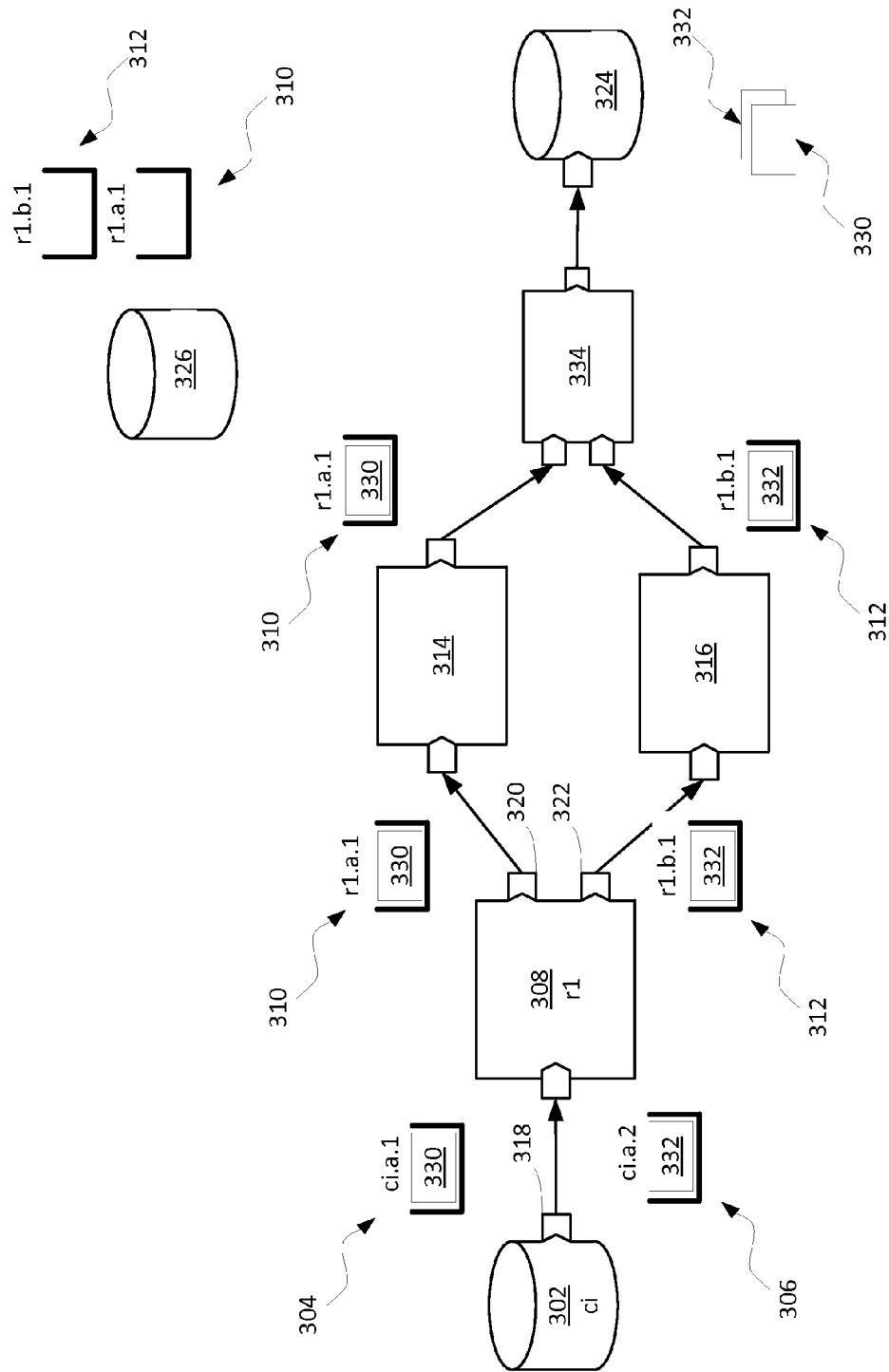
FIG. 3 illustrates an example of tracking a record through a modified dataflow graph using flow units.

FIG. 3 illustrates an example of tracking a record through a modified dataflow graph using flow units. A data source "ci" 302 includes two data records, a first data record 330 and a second data record 332. As the data records are provided from the data source "ci" 302 to the dataflow graph a flow unit is attached to each data record. The flow unit 304 is attached to the data record 330 and the flow unit 306 is attached to the data record 332.

In some implementations, the flow unit includes a component identifier associated with the flow unit, a group associated with the component, and a sequence number. The group can be, for example, an indication of a port through which the data record was provided. In some implementations, the flow unit can include a string formatted with component identifier, a group identifier, and a sequence" (e.g., "ci.a.1", "r1.a.1"). Each component identifier is capable of uniquely identifying a component in the data flow graph. For example, flow unit 304 includes the string "ci.a.1" where "ci" indicates the flow unit is associated with the data source "ci" 302, the group "a" indicates the data record was provided on the port associated with the letter "a" 318, and the sequence number "1" indicates that the data record was the first data record supplied from the data source "ci" 302 on the port associated with the letter "a" 318.

Similarly, flow unit 306 includes the string "ci.a.2" where "ci" indicates the flow unit is associated with the data source "ci" 302, the group "a" indicates the data record was provided on the port associated with the letter "a" 318, and the sequence number "2" indicates that the data record was the second data record supplied from the data source "ci" 302 on the port associated with the letter "a" 318. In some implementations, components and ports may be associated with numbers, letters, strings, or any other identifier.

In this example, both the first data record 330 and the second data record 332 are processed by a filtering component "r1" 308. The filtering component "r1" 308 provides the first data record 330 on a first port 320 and the second data record 332 on a second port 322. The first data record 330 is provided with a new flow unit 310. The new flow unit includes the string "r1.a.1" where the "r1" indicates the flow unit is associated with the filtering component "r1" 308, the "a" indicates that the data record was provided on the "a" port 320, and the "1" indicates the data record is the first data record provided on the "a" port 320 of the filtering component "r1" 308.

The filtering component "r1" 308 provides the second data record 332 on the "b" port 322. Similar to the first data record 330, the second data record is provided with a new flow unit 312. The new flow unit 312 includes the string "r1.b.1" where the "r1" indicates the flow unit is associated with the filtering component "r1" 308, the "b" indicates that the data record was provided on the "b" port 322, and the "1" indicates the data record is the first data record provided on the "b" port 322 of the filtering component "r1" 308.

Not every component provides a new flow unit to the data record. In this example, component 314, component 316, and component 334 are treated as pass through components. These components are ignored in the flow analysis process. Here, the first data record 330 retains its flow unit 310 and the second data record 332 retains its flow unit 312. In some implementations, components which do not alter the path of the data record do not provide new flow units. In other implementations, each component provides a new flow unit to the data records. The flow instrumentation engine may be selective in determining which components in the graph are instrumented such that a new flow unit is constructed and assigned a black or group to reflect having passed through a particular component and port.

Before the data records are stored in the data sink 324 the flow units are removed. The removed flow units are stored in a flow unit data store 326. In this example, the data sink 324 stores the first data record 330 and the second data record 332. The flow unit data store 326 stores the flow unit 312 and the flow unit 310.

Figure 4:
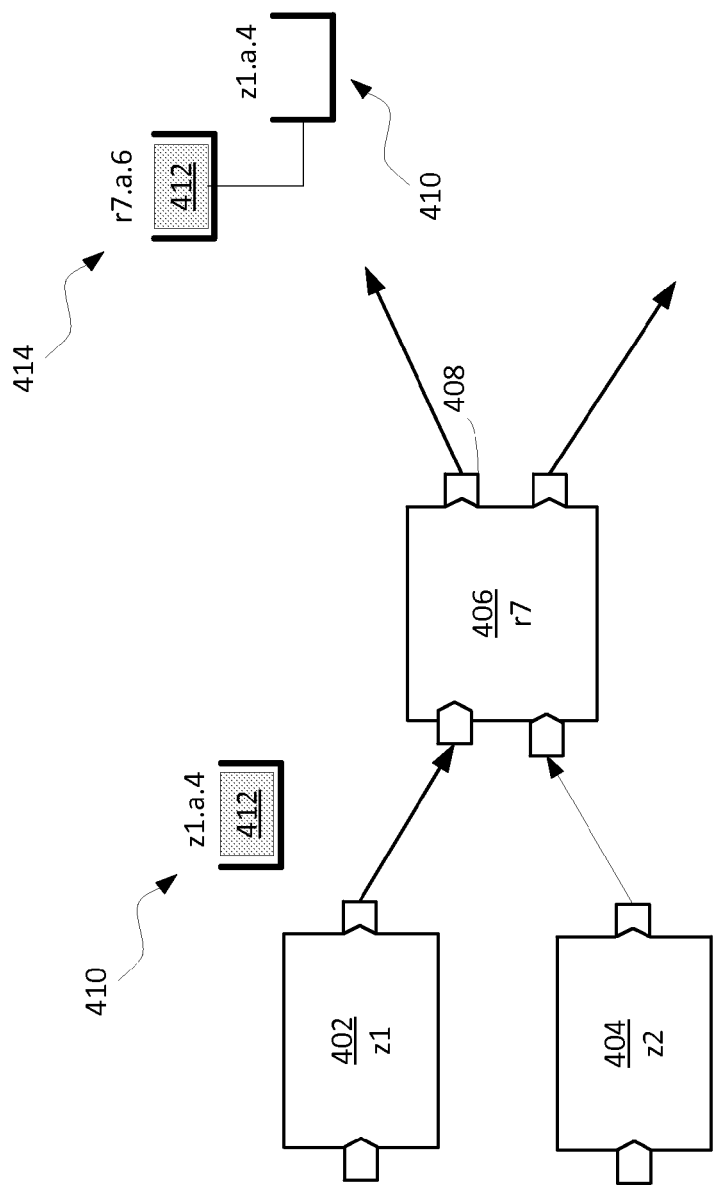
FIG. 4 illustrates an example of consuming flow units.

FIG. 4 illustrates an example of consuming flow units. Identifying a component, port, and sequence number is not always sufficient to uniquely identify a complete path through a dataflow graph. In order to identify a complete path, flow units can be combined. For example, referring to FIG. 4, a dataflow graph includes a component "z1" 402, a component "z2" 404, and a component "r7" 406. In this example, data record 412 is the fourth data record to be provided by the "a" port of the component "z1" 402. The data record 412 is provided with a flow unit 410 which includes the string "z1.a.4". After the data record 412 is processed by the component "r7" 406, the data record is provided with a new flow unit 414. The new flow unit indicates that the data record is the sixth data record provided on the "a" port 408 of the component "r7" 406 ("r7.a.6"). Without more, flow unit 414 does not indicate whether the data record 412 was provided by the component "z1" 402 or the component "z2" 404. In order to maintain the complete path, the flow unit 410 is incorporated into (or consumed by) the flow unit 412. In some implementations, a flow unit consumes a set of other flow units previously associated with the data record or with one or more data records that were processed to produce the data record.

Figure 5:
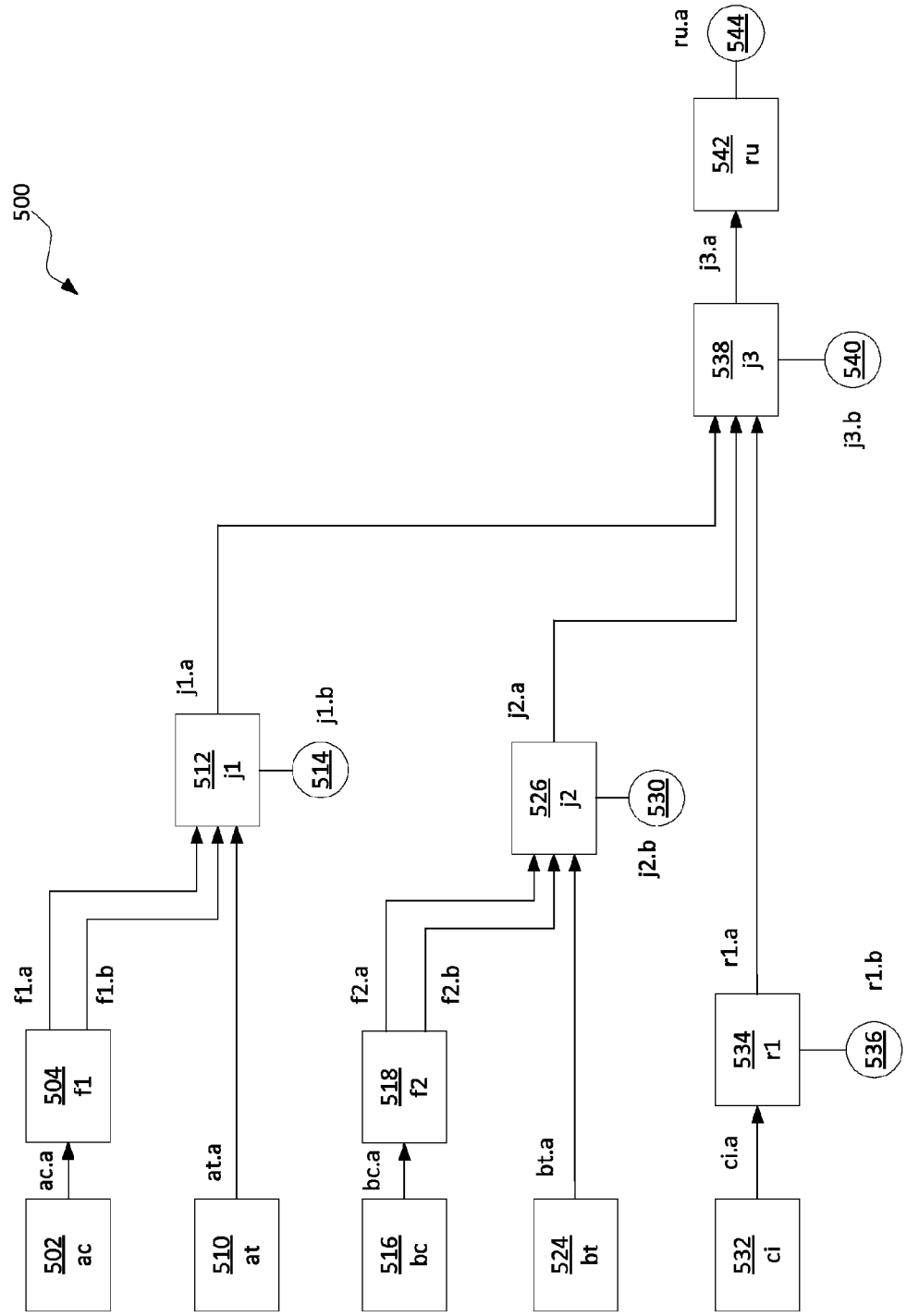
FIG. 5 illustrates an example of using flow units to track a path through a dataflow graph.

In other implementations, the flow unit maintains a reference to, versus a copy of, flow units previously associated with the processed data record or the processed data records. As each flow unit is replaced, the old flow unit is stored in a flow unit repository (e.g., the flow unit repository 218 of FIG. 2). The newly created flow unit contains a reference to the replaced flow unit stored in the flow unit repository. FIG. 5 illustrates and example of using flow units to track a path through a dataflow graph. Flow units can be used to track complex paths through a data flow graph. These complex flows can be described using a descriptive string such that each data record and its predecessors which follow the same path through the dataflow graph will have an identical string. By comparing the set of executed flow paths to the set of all possible flow paths through the dataflow graph, it can be determined whether the data records used to generate the set of executed flow paths is sufficient to test all paths in the data flow graph (i.e., whether the executed flow paths cover all of the possible flow paths).

Each flow unit is associated with a data record, and since flow units also reference other "consumed" flow units, it's possible to identify the complete set of records that were processed to produce each flow unit. By selecting a subset of generated flow units, one may select subset of data records that correspond to the selected flow units. For example, a dataflow graph 500 may be used to profile customer demographics. In this example, a flow of data records representing a set of customers "a" is provided by component "ac" 502 (short for "a" customers). A partitioning component "f1" 504, partitions the data records into two sets, each set provided on a different output port. For example, the partitioning component "f1" 504 could partition the "a" customers based on ZIP code.

Flow data records representing a set of transactions consummated by the "a" customers is provided by component "at" 510 (short for "a" transactions).

The join component 512 joins the customer data records and the customer transactions to produce a flow of combined data records for the "a" customers. Customer data records that cannot be joined to transaction data records and transaction data records that cannot be joined to customer data records are provided on a separate output port which leads to exit point 514. In general, each customer transaction data record is associated with the customer who consummated the transaction. In this example, the customer may be represented by a customer data record from the "a" port for the partitioning component "f1" 504 or a customer data record from the "b" port of the partitioning component "f1" 504, but not both.

A flow of data records representing a set of "b" customers is provided by component "bc" 516 (short for "b" Customers). A partitioning component "f2" 518, partitions the data records into two sets, each set provided on a different output port. For example, the partitioning component "f2" 518 could partition the "b" customers based on ZIP code.

Flow data records representing a set of transactions consummated by the "b" customers is provided by component "bt" 524 (short for "a" transactions).

The join component "j2" 526 joins the "b" customer data records and the "b" customer transactions to produce a flow of combined data records for the "b" customers. Customer data records that cannot be joined to transaction data records and transaction data records that cannot be joined to customer data records are provided on a separate output port which leads to exit point 530. In general, each customer transaction data record is associated with the customer who consummated the transaction. In this example, the customer may be represented by a customer data record from the "a" port for the partitioning component "f2" 518 or a customer data record from the "b" port of the partitioning component "f2" 518, but not both.

A flow of data records representing general customer information is provided by component "ci" 532 (short for customer information). Component "r1" 534 reformats the data records that provide customer information. Data records which cannot be reformatted are provided on a port which flows to an exit point 536. Data records which can be reformatted are provided on a second port.

Join component "j3" 538 combines the reformatted customer information data records with data records from join component "j1" 512 and data records from join component "j2" 526. Data records that cannot be joined are provided on an output port which flows to exit point 540. The joined data records are provided on an output port and flow to a roll-up component "ru" 542. In general, the component "j3" 538 combines the reformatted customer information data record with a data record from the "a" port for the partitioning component "j1" 512 or with a data record from the "a" port of the partitioning component "j2" 526.

The rollup component "ru" 542 aggregates the customer transaction records based on some criteria, for example, based on zip code. The aggregated records are provided on a port which leads to exit point 544.

The dataflow graph 500 is modified to track the flow of data records using flow units. For example, using a dataflow graph instrumentation engine (e.g., the dataflow graph instrumentation engine 206 shown in FIG. 2). Using a string representation, the flow units can describe a complex flow of data records through a dataflow graph independent of the individual data records that may be combined to describe the flow. For example, data records provided by component "ac" may be tagged by the flow unit string "ac.a" indicating the data record originated on the "a" port for component "ac" 502.

Once the data record is filtered by the filter component "f1" 504, the data record can be tagged by the flow unit string "f1.$b$" indicating the data record was provided on the "b" port of the filter component "f1" 504. In some implementations, the flow unit can include a history string that identifies each portion of the path taken by the data record. For example, the data record can be tagged with a history string "(ac.a)f1.$b$". Parenthesis can be used to indicate that the f1.$b$ flow unit consumed the ac.a flow unit.

Similarly, data records provided by the component "at" 510 are tagged with a flow unit with a history string "at.a" indicating that the data record was provided on the a port of the component "at" 510.

The join component "j1" 512 combines one customer data record from the filter component "f1" 504 with a transaction record from the component "at" 510. The combined data record can be tagged with a flow unit with the history string "((ac.a)f1.$b$,at.a)j1.$a$" indicating that the new flow unit was created by combining a flow unit from the customer record ("(ac.a)f1.$b$") and the transaction record ("at.a"). A comma can be used to separate multiple flow units which are combined together.

Similarly, a customer information data record is provided by the component "ci" 532 and is tagged with a flow unit having a history string "ci.a". The customer information data record is reformatted by the component "r1" 534. The reformatted customer information data record is tagged with a flow unit having a history string "(ci.a) r1.$a$".

The join component "j3" 538 combines the combined data record from the join component "j1" 512 and the reformatted customer information data record from the component "r1" 534. The new combined record can be tagged with a flow unit having the history string "(((ac.a)f1.$b$,at.a)j1.$a$, (ci.a)r1.$a$)j3.$a$"

The rollup component "ru" 542 combines multiple records emanating from the join component "j3" into a single record. An asterisk in the history field can be used to indicate that multiple records from the same flow are combined together. For example, the rollup record can be tagged with a flow unit with a history string "(*((((ac.a)f1.$b$,at.a) j1.$a$,(ci.a)r1.$a$)j3.$a$)ru.a". This notation indicates that multiple "(((ac.a)f1.$b$,at.a)j1.$a$,(ci.a)r1.$a$)j3.$a$" flow units were consumed in the production of the ru.a flow unit.

Figure 6:
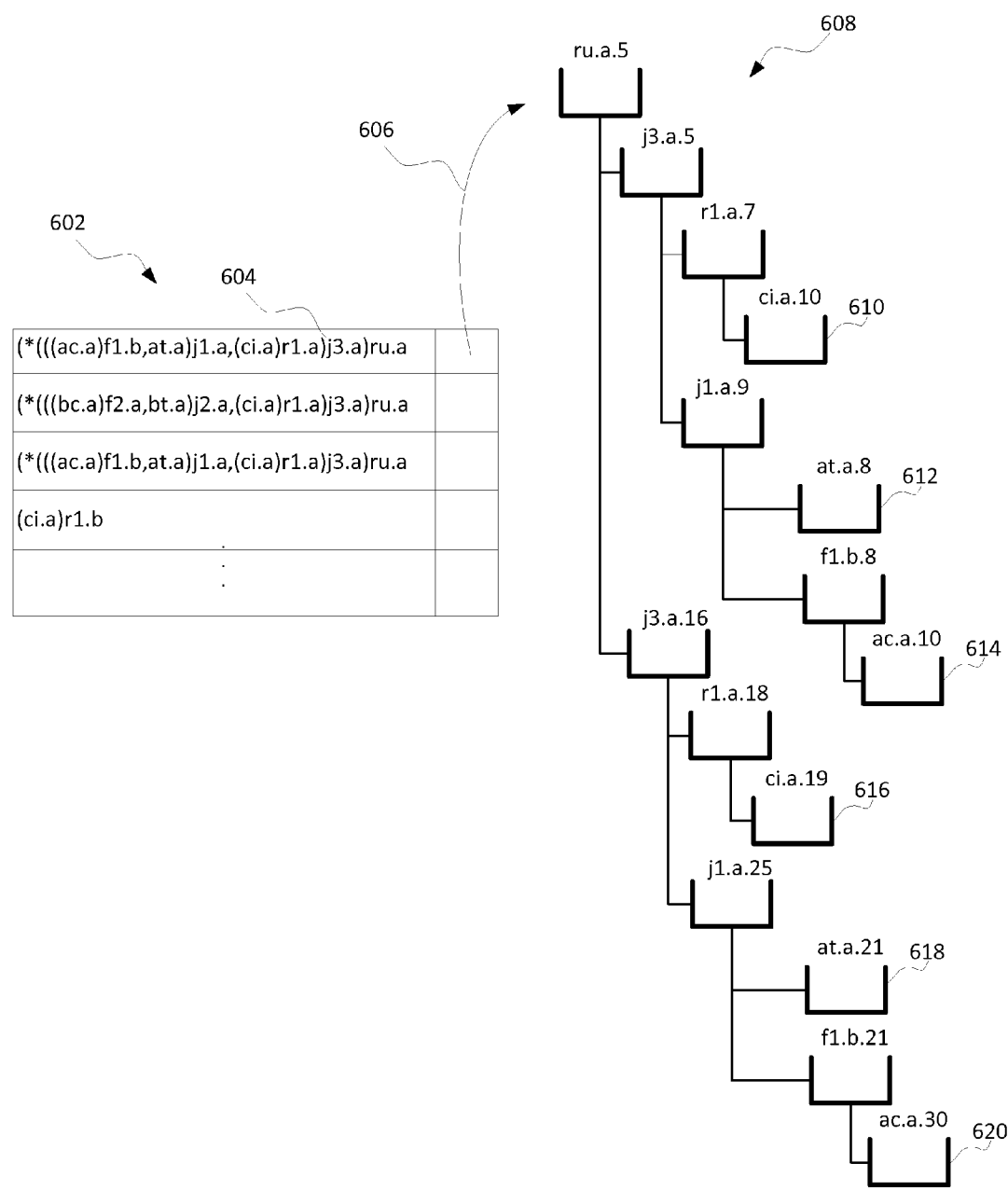
FIG. 6 illustrates an example of identifying input data records which results in the production of an output data record.

FIG. 6 illustrates an example of identifying input data records which results in the production of an output data record. Once all of the execution flow path histories are determined, the flow path histories can be used to determine a subset of data which provides full or partial coverage over all or some of the execution flow paths. A table 602, for example stored in a relational database, includes the execution flow paths for all of the data records produced from the dataflow graph 500 of FIG. 5. Each row of the table 602 corresponds to an output data record produced by the dataflow graph. One column of the table includes the flow unit history which describes the execution path taken to produce the output record. From the output record the input records can be determined. Each output record corresponds to a flow unit which includes nested flow units as described above with respect to FIG. 4. For example, as represented by arrow 606, the row 604 contains a representation of the flow unit 608. The flow unit 608 includes all flow units consumed in the creation of the flow unit. The input data records necessary to produce the output data record corresponding to row 604 can be determined by examining the "leaf nodes" of the flow unit tree. That is the flow units that did not consume any other flow units in their creation.

In this example, nested flow unit 610 indicates that the 10th data record provided on the "a" port of the component "ci" was used in the creation of the output data record. Since the component "ci" contains only a single port (see component "ci" 532 of FIG. 5) the input data record can be uniquely identified.

Similarly, nested flow units 612, 614, 616, 618, and 620 indicate that the $8^{th}$ data record provided on the "a" port of the component "at", the $10^{th}$ data record provided on the "a" port of the component "ac", the $19^{th}$ flow unit provided on the "a" port of the component "ci", the $21^{st}$ data record provided on the "a" port of the component "at", and the $30^{th}$ data record provided on the "a" port of the component "ac", respectively, were used in the creation of the output data record. A sample set of data including these records will produce the output data record corresponding to row 604 of the table 602.

By using the flow unit histories associated with a selected subset of output data records, a subset of input data records may be selected that produces these output records. This subset of input data records may be used for testing or analysis without altering the behavior of the program. For example, if the testing set did not include the 21st data record provided on the "a" port of the component "at", then the execution of the graph would not produce the same output record.

Figure 7:
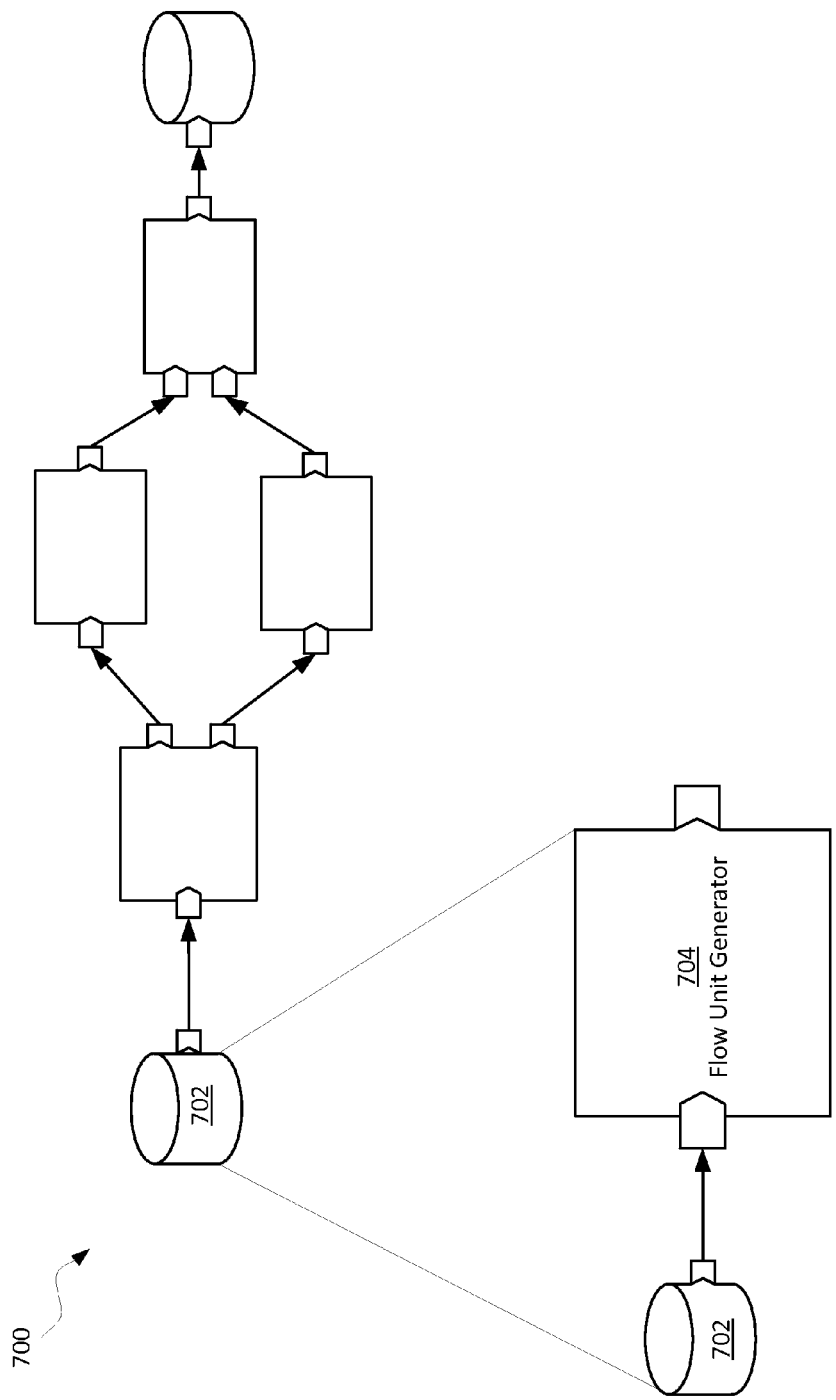
FIG. 7 illustrates an example of modifying a data source component of a dataflow graph to add flow units to data records.

FIG. 7 illustrates an example of modifying a data source component of a dataflow graph to add flow units to data records. In general dataflow graphs can be instrumented to add flow units to data records, combine flow units together to provide a map of execution paths to the dataflow graph, and remove flow units prior to the data record exiting the dataflow graph.

Modifying a dataflow graph 700 to provide record lineage can include adding a component after each data source that reformats each data record to include a flow unit. In some implementations, each data source is replaced with a sub graph (or a nested graph) that contains a copy of the original input data set component and a component that reformats each data record to include the flow unit. For example, the dataflow graph 700 is modified so that the data source 702 provides data records to a flow unit generator component 704.

In some implementations the flow unit generator component 704 adds an additional field to each data record, the additional field being a flow unit as described above.

Figure 8:
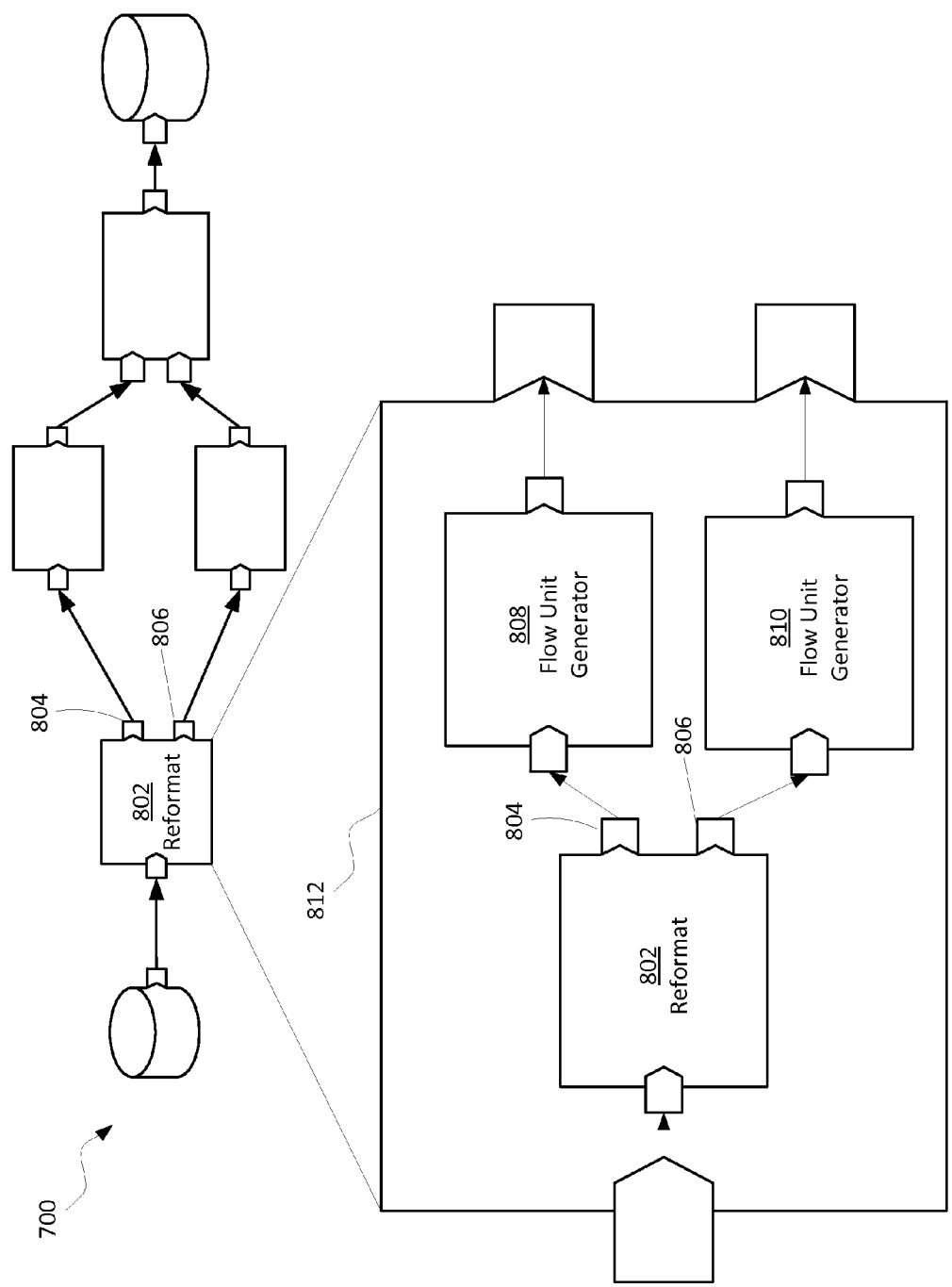
FIG. 8 illustrates an example of modifying a component with multiple output ports to add flow units to data records.

FIG. 8 illustrates an example of modifying a component with multiple output ports to add flow units to data records. Dataflow graph 700 includes a reformat component 802 that has multiple output ports 804, 806. In this example, a separate flow unit generator component is added for each port. Port 804 corresponds to flow unit generator 808 and port 806 corresponds to flow unit generator 810. In some implementations, the components with multiple output ports are replaced with a sub graph. For example the sub graph 812, contains a copy of the original component and provides data records with flow units on each port.

Figure 9:
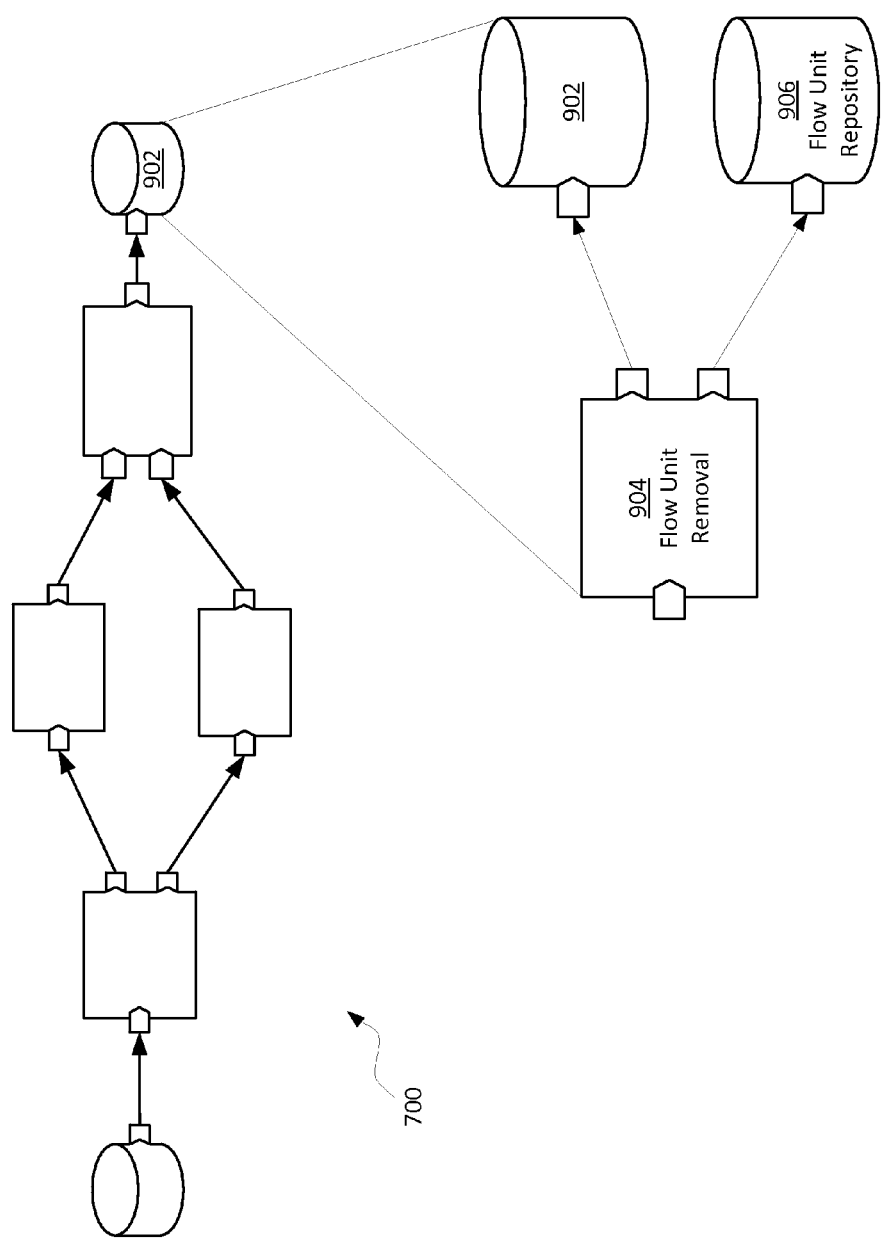
FIG. 9 illustrates an example of modifying a data sink to process flow units.

FIG. 9 illustrates an example of modifying a data sink to process flow units. The dataflow graph 700 includes a data sink 902. The data flow graph is modified to add a flow unit removal component 904. The flow unit removal component 904 removes the flow unit from the data record and stores it in a flow unit repository 906. The data record without the flow unit is stored in the data sink 902.

Figure 10:
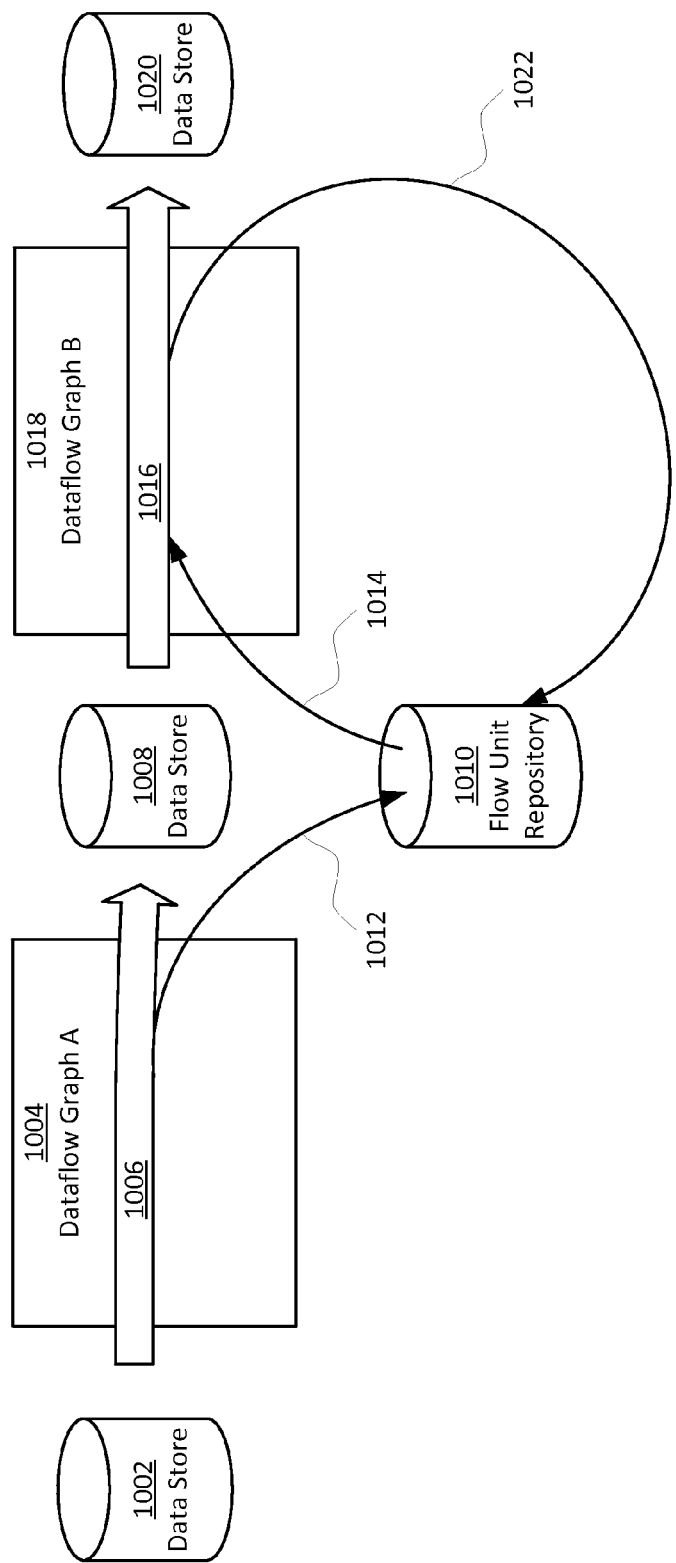
FIG. 10 illustrates an example of using flow units across multiple dataflow graphs.

FIG. 10 illustrates an example of using flow units across multiple dataflow graphs. For example, an instrumented dataflow graph A 1004 reads data records from a data store 1002. Represented by process arrow 1006, dataflow graph A 1004 processes the records and produces output data records into data store 1008. Represented by process arrow 1012, each output data record produced by dataflow graph A 1004 is associated with a flow unit which is stored in a flow unit repository 1010.

Represented by process arrow 1016, instrumented dataflow graph B reads data the data records from the data store 1008, processes the records, and stores them in the data store 1020. Represented by process arrow 1014, instead of creating a new flow unit for each data record read from the data store 1008, the instrumented dataflow graph B 1018 reads the flow unit associated with the data record from the flow unit repository 1010.

Represented by process arrow 1022, the instrumented data graph stores the flow units in the flow unit repository 1010. The flow units produced from the instrumented dataflow graph B 1018 includes consumed flow units and a history that identifies the full execution path of the data record and its predecessor data records through both dataflow graph A 1004 and dataflow graph B 1018.

Figure 11:
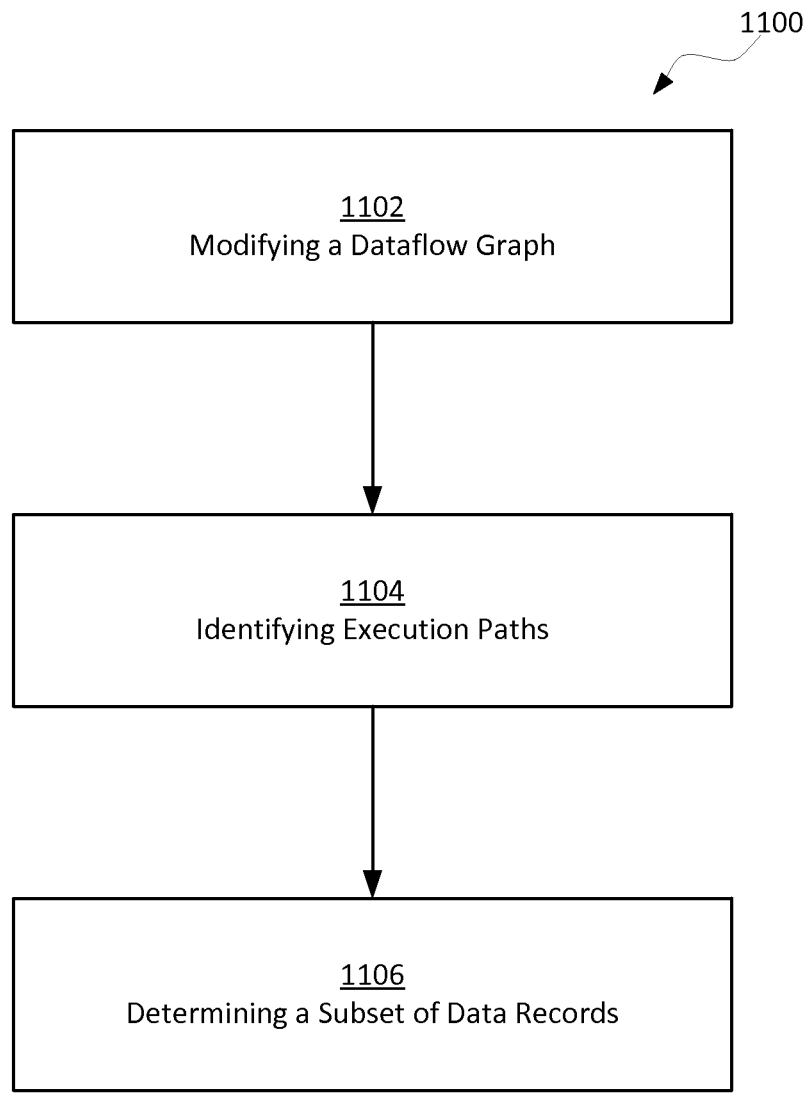
FIG. 11 illustrates an example process for flow analysis.

FIG. 11 illustrates an example process for flow analysis. The process can be implemented on one or more computing devices, for example, the computer 112 of FIG. 1.

The process 1100 modifies 1102 a data flow graph. The dataflow graph is modified to add and remove flow units from data records processed by the dataflow graph. Each flow unit identifies a segment of a path through the dataflow graph.

The process 1100 identifies 1104 execution paths based on the flow units. The flow units can be used to identify the path through the dataflow graph taken by a data record and the preceding records used to produce it.

The process 1100 determines 1106 a subset of data records. The subset of data records is determined based on execution path such that at least one data record in the subset took each execution path through the dataflow graph.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The flow analysis approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer-implemented method including:
   modifying a dataflow graph, the dataflow graph including a plurality of paths connecting at least one entry point and at least one exit point, including:
      adding components to the dataflow graph that add flow units to data records and remove flow units from data records, each flow unit tagging a specified data record with information identifying (i) a segment of a path through the dataflow graph traversed by the specified data record, and (ii) one or more other data records upon which the specified data record depends, when the specified data record is dependent on one or more other data records;
   for a data record processed using the modified dataflow graph,
      generating, based on one or more flow units tagging the data record, a record lineage that specifies (i) which one of the plurality of paths of the dataflow graph is traversed by the data record, and (ii) one or more other data records upon which the processed data record depends, when the data record is dependent on one or more other data records;
   based on record lineages generated, identifying execution paths of the data records through the modified dataflow graph including the plurality of paths connecting the at least one entry point and the at least one exit point, wherein a first one of the execution paths through the modified dataflow graph traversed by a first one of the data records is distinct from a second one of the execution paths through the modified dataflow graph traversed by a second one of the data records; and
   based on a selected set of the execution paths through the modified dataflow graph including the plurality of paths connecting the at least one entry point and the at least one exit point, determining a subset of the plurality of data records having traversed that selected set of the execution paths.

2. The method of claim 1 wherein identifying an execution path includes determining a set of flow units added to a data record.

3. The method of claim 1 further including identifying unused paths in the plurality of paths that are not in the execution paths.

4. The method of claim 1 further including processing the subset of the plurality of data records using the dataflow graph.

5. The method of claim 1 further including processing the plurality of data records by adding a first flow unit to a data record of the plurality of data records.

6. The method of claim 5 wherein processing the plurality of data records includes adding a second flow unit to the data record and adding the first flow unit to the second flow unit.

7. The method of claim 1 wherein identifying execution paths includes:
   removing flow units from the plurality of data records processed using the modified dataflow graph; and
   analyzing the removed flow units to determine an execution path for each data record.

8. The method of claim 7 wherein determining a subset of the plurality of data records includes identifying data records that have one of the execution paths in the selected set.

9. A system, including:
   one or more computers programmed to perform operations including:
      modifying a dataflow graph, the dataflow graph including a plurality of paths connecting at least one entry point and at least one exit point, including:
         adding components to the dataflow graph that add flow units to data records and remove flow units from data records, each flow unit tagging a specified data record with information identifying (i) a segment of a path through the dataflow graph traversed by the specified data record, and (ii) one or more other data records upon which the specified data record depends, when the specified data record is dependent on one or more other data records;
      for a data record processed using the modified dataflow graph,
         generating, based on one or more flow units tagging the data record, a record lineage that specifies (i) which one of the plurality of paths of the dataflow graph is traversed by the data record, and (ii) one or more other data records upon which the processed data record depends, when the data record is dependent on one or more other data records;
      based on record lineages generated, identifying execution paths of the data records through the modified dataflow graph including the plurality of paths connecting the at least one entry point and the at least one exit point, wherein a first one of the execution paths through the modified dataflow graph traversed by a first one of the data records is distinct from a second one of the execution paths through the modified dataflow graph traversed by a second one of the data records; and
      based on a selected set of the execution paths through the modified dataflow graph including the plurality of paths connecting the at least one entry point and the at least one exit point, determining a subset of the plurality of data records having traversed that selected set of the execution paths.

10. The system of claim 9 wherein identifying an execution path includes determining a set of flow units added to a data record.

11. The system of claim 9 further including identifying unused paths in the plurality of paths that are not in the execution paths.

12. The system of claim 9 further including processing the subset of the plurality of data records using the dataflow graph.

13. The system of claim 9 further including processing the plurality of data records by adding a first flow unit to a data record of the plurality of data records.

14. The system of claim 13 wherein processing the plurality of data records includes adding a second flow unit to the data record and adding the first flow unit to the second flow unit.

15. The system of claim 9 wherein identifying execution paths includes:
   removing flow units from the plurality of data records processed using the modified dataflow graph; and
   analyzing the removed flow units to determine an execution path for each data record.

16. The system of claim 15 wherein determining a subset of the plurality of data records includes identifying data records that have one of the execution paths in the selected set.

17. A computer hardware storage device encoded with a computer program, the computer program including instructions that when executed by data processing apparatus cause the data processing apparatus to perform operations including:
   modifying a dataflow graph, the dataflow graph including a plurality of paths connecting at least one entry point and at least one exit point, including:
      adding components to the dataflow graph that add flow units to data records and remove flow units from data records, each flow unit tagging a specified data record with information identifying (i) a segment of a path through the dataflow graph traversed by the specified data record, and (ii) one or more other data records upon which the specified data record depends, when the specified data record is dependent on one or more other data records;
   for a data record processed using the modified dataflow graph,
      generating, based on one or more flow units tagging the data record, a record lineage that specifies (i) which one of the plurality of paths of the dataflow graph is traversed by the data record, and (ii) one or more other data records upon which the processed data record depends, when the data record is dependent on one or more other data records;
   based on record lineages generated, identifying execution paths of the data records through the modified dataflow graph including the plurality of paths connecting the at least one entry point and the at least one exit point, wherein a first one of the execution paths through the modified dataflow graph traversed by a first one of the data records is distinct from a second one of the execution paths through the modified dataflow graph traversed by a second one of the data records; and
   based on a selected set of the execution paths through the modified dataflow graph including the plurality of paths connecting the at least one entry point and the at least one exit point, determining a subset of the plurality of data records having traversed that selected set of the execution paths.

18. The computer hardware storage device of claim 17 wherein identifying an execution path includes determining a set of flow units added to a data record.

19. The computer hardware storage device of claim 17 further including identifying unused paths in the plurality of paths that are not in the execution paths.

20. The computer hardware storage device of claim 17 further including processing the subset of the plurality of data records using the dataflow graph.

21. The computer hardware storage device of claim 17 further including processing the plurality of data records by adding a first flow unit to a data record of the plurality of data records.

22. The computer hardware storage device of claim 21 wherein processing the plurality of data records includes adding a second flow unit to the data record and adding the first flow unit to the second flow unit.

23. The computer hardware storage device of claim 17 wherein identifying execution paths includes:
  removing flow units from the plurality of data records processed using the modified dataflow graph; and
  analyzing the removed flow units to determine an execution path for each data record.

24. The computer hardware storage device of claim 23 wherein determining a subset of the plurality of data records includes identifying data records that have one of the execution paths in the selected set.

25. A system including:
  means for modifying a dataflow graph, the dataflow graph including a plurality of paths connecting at least one entry point and at least one exit point, including:
    means for adding components to the dataflow graph that add flow units to data records and remove flow units from data records, each flow unit tagging a specified data record with information identifying (i) a segment of a path through the dataflow graph traversed by the specified data record, and (ii) one or more other data records upon which the specified data record depends, when the specified data record is dependent on one or more other data records;
  for a data record processed using the modified dataflow graph,
    means for generating, based on one or more flow units tagging the data record, a record lineage that specifies (i) which one of the plurality of paths of the dataflow graph is traversed by the data record, and (ii) one or more other data records upon which the processed data record depends, when the data record is dependent on one or more other data records;
  based on record lineages generated, means for identifying execution paths of the data records through the modified dataflow graph including the plurality of paths connecting the at least one entry point and the at least one exit point, wherein a first one of the execution paths through the modified dataflow graph traversed by a first one of the data records is distinct from a second one of the execution paths through the modified dataflow graph traversed by a second one of the data records; and
  based on a selected set of the execution paths through the modified dataflow graph including the plurality of paths connecting the at least one entry point and the at least one exit point, means for determining a subset of the plurality of data records having traversed that selected set of the execution paths.

26. A computer-implemented method including:
modifying a set of data processing operations representing a plurality of paths from at least one entry point to at least one exit point to include operations for adding flow units to data records, each flow unit tagging a specified data record with information identifying (i) one or more data processing operations that processed the specified data record, and (ii) one or more other data records upon which the specified data record depends, when the specified data record is dependent on one or more other data records;
processing a plurality of data records with the modified set of data processing operations;
for a data record processed using the modified set of data processing operations,
  generating, based on one or more flow units tagging the data record, a record lineage that specifies (i) one or more data processing operations that processed the data record, and (ii) one or more other data records upon which the processed data record depends, when the data record is dependent on other data records;
based on record lineages for the plurality of data records, identification execution paths of the data records through the set of data processing operations representing the plurality of paths from the at least one entry point to the at least one exit point; and
based on the execution paths through the set of data processing operations representing the plurality of paths from the at least one entry point to the at least one exit point, identifying which data processing operations processed a subset of the plurality of data records.

* * * * *